Patented June 10, 1947

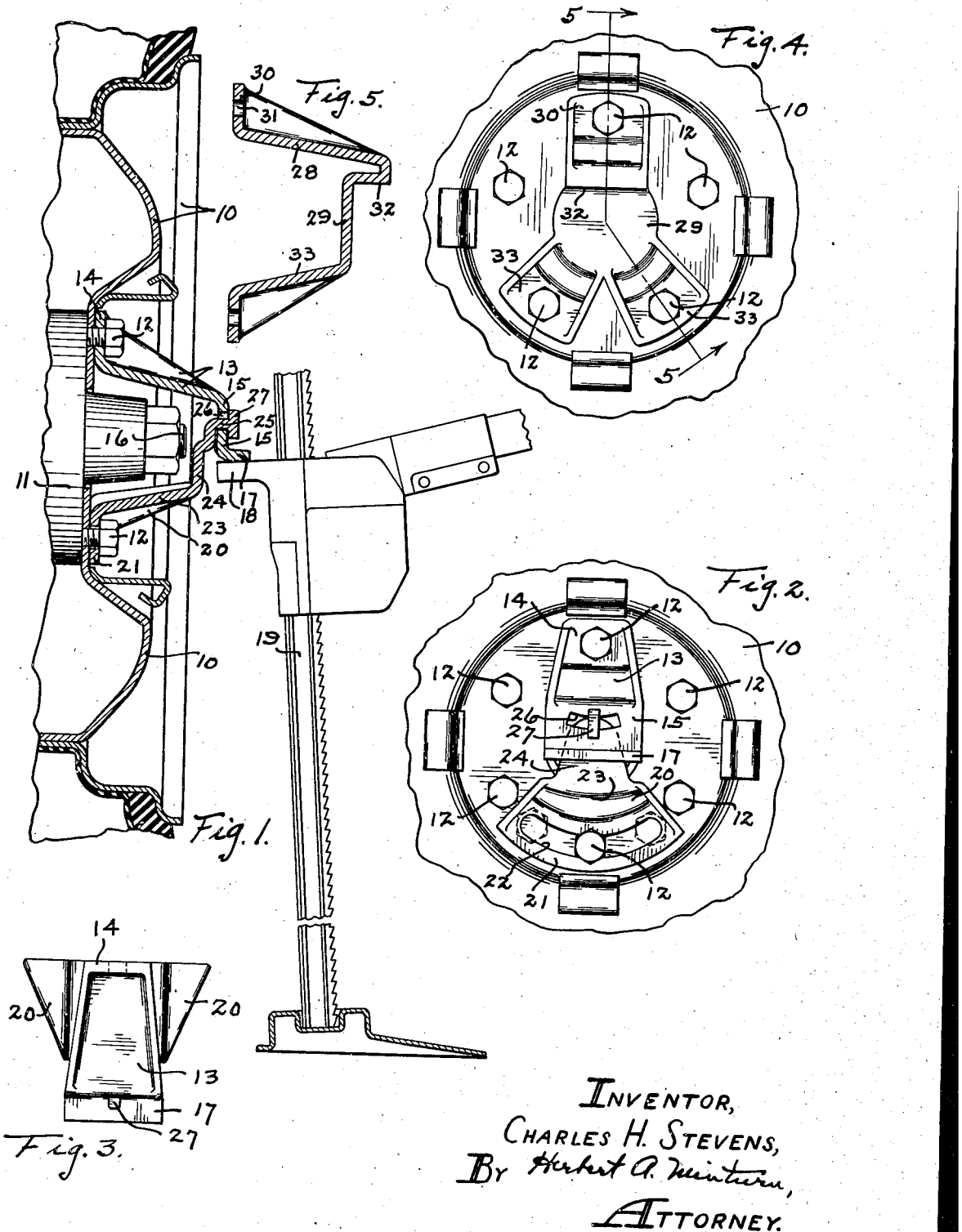

2,422,144

UNITED STATES PATENT OFFICE 2,422,144

WHEEL ABUTMENT FOR JACKS

Charles H. Stevens, Indianapolis, Ind.

Application February 6, 1946, Serial No. 645,717

3 Claims. (Cl. 254—133)

This invention relates to an attachment to be applied to wheels, particularly automobile wheels, to serve as abutments against which the head of a jack may bear in order to permit lifting of the wheel by the jack. The primary object of the invention is to provide a simple abutment structure which may be applied to a wide range of automobile wheels which may vary in the bolt spacing as is encountered in different makes of automobiles.

A still further advantage of the invention resides in the fact that the abutment may be produced and sold at a relatively low cost and in many instances may be applied to the wheel when the wheel is mounted on its hub and allowed to remain in the mounted position under the usual hub cap.

These and many other objects and advantages of the invention will become apparent to those versed in the art in the following description made in reference to the accompanying drawing in which Fig. 1 is a view in vertical section through a fragmentary portion of a wheel to which the invention is applied;

Fig. 2, a view in front elevation;

Fig. 3, a view in top plan of the abutment apart from the wheel;

Fig. 4, a view in front elevation of a modified form of the invention; and

Fig. 5, a view in section on a line 5—5 in Fig. 4.

Like characters of reference indicate like parts throughout the several views in the drawing.

Automobile wheels, such as the wheel 10 are commonly mounted on their hubs 11 by means of cap screws 12 arranged in spaced apart relation at a common radius from the center of rotation of the wheel. The radius of location of these screws 12 will vary between different makes of wheels, and also the number of the screws employed will range generally from four to six, six being shown in the present example.

I form a bracket 13 which has an upper end portion 14 to bear against the face of the wheel 10 to receive one of the screws 12 therethrough. From this upper portion 14, the bracket 13 is carried outwardly and then downturned by a portion 15 spaced to clear the end of any member such as the axle 16 which may extend beyond the hub 11. From the lower end of this portion 15 is a foot 17 turned outwardly to form an abutment against which the head 18 of a jack 19 may bear.

A second bracket 20 is formed to have a lower wheel bearing portion 21 through which is provided an arcuate slot 22 having a radius of curvature approximating that of the circle of the cap screws 12. The width of this slot 22 is made to exceed slightly the diameters of the screws 12. The length of the slot 22 is made to accommodate from one to two of the screws 12 depending upon the number employed. For example, as indicated in Fig. 2 the slot 22 may receive therethrough one screw 12 where six are employed, or it may receive therethrough two indicated by the dash lines, when there are five screws employed. Likewise when four screws are employed, the slot 22 will have but one screw passed therethrough.

From the portion 21 of the bracket 20 extends a web 23 outwardly and relatively upwardly to have an outer upturned portion 24 extending within or behind the portion 15 of the other bracket 13. This portion 24 carries a forwardly extending neck 25 which will freely pass through a slot 26 provided in the portion 15 of the bracket 13 by first rocking the bracket 20 around to permit the head 27 that is provided on the outer end of the neck 25 to pass through the slot 26, whereupon the bracket 20 is rocked back to the position indicated in Fig. 2 to have the head 27 abut the front side of the portion 15 to prevent withdrawal. The slot 26 is preferably made a little wider than the vertical thickness of the neck 25 to permit relative vertical adjusting of the two brackets 13 and 20 to accommodate the assembly to the possible varying diameter circles of the screws 12. However it is desired that the bracket 20 be dropped to have the neck 25 resting on the lower edge portion of the slot 26.

This bracket 20 serves to prevent the bracket 13 from springing upwardly when the jack head 18 is forced against the head 17.

Referring to that form of the invention as illustrated in Figs. 4 and 5, the attachment is made in one piece to straddle the axle or bearing cap projection. An upper foot 28 of the bracket 29 in this instance is turned inwardly to have a foot 30 to bear against the face of the wheel and carry a hole 31 through which a screw 12 may be passed. From the outer end of this foot 28, the bracket has an undercut portion to provide an abutment 32 for the jack head. Then the bracket is carried substantially vertically downwardly and thence turned back toward the wheel by a bifurcated lower foot 33 which carries holes through which two of the screws 12 may be passed. When thus made, this type of bracket will have to be made in varying sizes or with different spacings of holes to accommodate the different numbers and spacings of the cap screws 12.

While I have herein shown and described my

I claim:

1. A jack abutment attachment for wheels having a ring of wheel securing bolts, comprising a bracket; a top leg inwardly turned from the upper portion of the bracket; a foot on the leg through which one of the wheel bolts may be passed; a knee on the underside of the bracket forming an abutment for the head of a lifting jack; a leg down and inturned from the bracket back of said knee; and a foot on said last leg through which may be passed one of said wheel bolts substantially diametrically removed from the said top foot bolt; said bracket having a slot through its forward portion below said top leg; said downturned leg being a separate member from the bracket; a neck extending from the upper portion of said downturned leg to enter said slot, whereby that leg may be rocked relative to the bracket to accommodate its foot to varying spacing apart and ring diameters of said bolts.

2. A jack abutment attachment for wheels having a ring of wheel securing bolts, comprising a bracket; a top leg inwardly turned from the upper portion of the bracket; a foot on the leg through which one of the wheel bolts may be passed; a knee on the underside of the bracket forming an abutment for the head of a lifting jack; a leg down and inturned from the bracket back of said knee; and a foot on said last leg through which may be passed one of said wheel bolts substantially diametrically removed from the said top foot bolt; said bracket having a slot through its forward portion below said top leg; said downturned leg being a separate member from the bracket; a neck extending from the upper portion of said downturned leg to enter said slot, whereby that leg may be rocked relative to the bracket to accommodate its foot to varying spacing apart and ring diameters of said bolts; and a head on said neck engaging said bracket on a forward side of said bracket to hold the bracket against outward bending.

3. A jack abutment attachment for wheels having a ring of wheel securing bolts, comprising a bracket; a top leg inwardly turned from the upper portion of the bracket; a foot on the leg through which one of the wheel bolts may be passed; a knee on the underside of the bracket forming an abutment for the head of a lifting jack; a leg down and inturned from the bracket back of said knee; and a foot on said last leg through which may be passed one of said wheel bolts substantially diametrically removed from the said top foot bolt; said bracket having a slot through its forward portion below said top leg; said downturned leg being a separate member from the bracket; a neck extending from the upper portion of said downturned leg to enter said slot, whereby that leg may be rocked relative to the bracket to accommodate its foot to varying spacing apart and ring diameters of said bolts; said lower leg foot having an arcuate slot equal substantially to the circumferential spacing apart of two adjacent wheel bolts.

CHARLES H. STEVENS.

REFERENCES CITED

The following references are of record in the file of this patent:

UNITED STATES PATENTS

| Number | Name | Date |
|---|---|---|
| 2,073,012 | Hunter | Mar. 9, 1937 |
| 2,239,729 | Mizer | Apr. 29, 1941 |
| 2,063,060 | Sheetz | Dec. 8, 1936 |

FOREIGN PATENTS

| Number | Country | Date |
|---|---|---|
| 19,180 | Australia | Sept. 5, 1934 |